Figure 1:
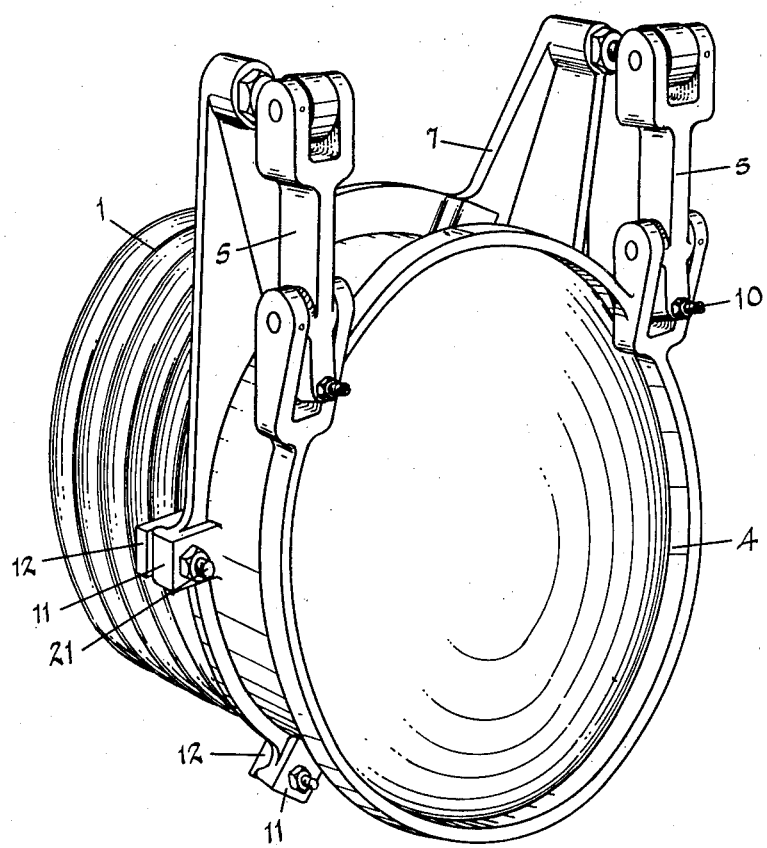

Aug. 31, 1943.                C. S. BROWN                 2,328,419
                              FLAP-GATE
                         Filed July 1, 1941          2 Sheets-Sheet 1

Inventor
Chalmers S. Brown
By
    Attorney

Aug. 31, 1943.  C. S. BROWN  2,328,419
FLAP-GATE
Filed July 1, 1941  2 Sheets-Sheet 2

Inventor
Chalmers S. Brown
By
Attorney

Patented Aug. 31, 1943

2,328,419

UNITED STATES PATENT OFFICE 2,328,419

FLAP GATE

Chalmers S. Brown, Lima, Ohio, assignor to Brown and Brown, Incorporated, Lima, Ohio, a corporation of Ohio Application July 1, 1941, Serial No. 400,678

3 Claims. (Cl. 251—123)

My invention has for its object to provide a flap-gate for controlling discharge of water or other liquids through pipes. The invention is particularly advantageous when used for controlling the flow of liquids in pipes to provide for the discharge of liquids where there is a variation in the liquid level that affects the outflow from the discharge pipes. The invention thus provides an efficient flap-gate or back water gate to prevent the influx of water into the discharge pipe.

By reason of the common use of corrugated sheet metal pipes, the gate is provided with a rigid frame for pivotally and swingedly supporting the movable part of the gate and forming a seat for the gate. Also a durable means is provided for securely connecting the supporting frame to the thin wall of the sheet metal pipe that is operable to prevent the constant unusual working of the gate from tearing the frame from the end of the pipe. Thus, the frame of the gate is secured to the pipe through a lead cushion that eliminates initial tearing of the pipe metal.

The invention is of particular value when used as a tide water gate where, during the rise of the tide, there is considerable deposition of sand at the outlet of the discharge pipe. The gate is opened and closed by the differential of the head pressures of the tide water on the outside of the gate and the liquid within the pipe, and also by the tilt of the gate produced by the sand, as modified by the supporting means of the movable part of the gate, and also by the configuration of the contacting lower edge portions of the parts of the gate which enables the gate to slide relative to its seat as the gate is pivoted and raised to an open position or is lowered to a closed position.

The invention may be contained in structures of different forms, and to illustrate a practical application of the invention, a flap gate is shown in the drawings that may be greatly varied in its details within the scope of the clams hereinafter appended.

Figure 2:
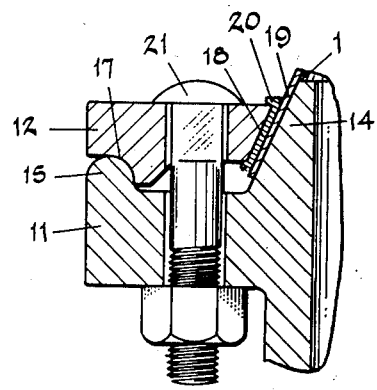
Figure 4:
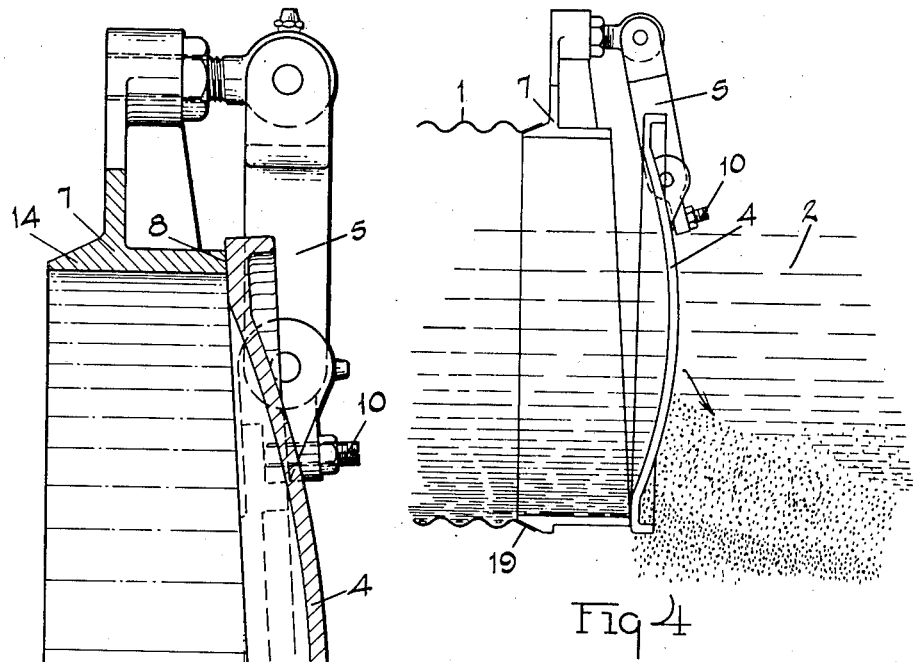
Figure 3:
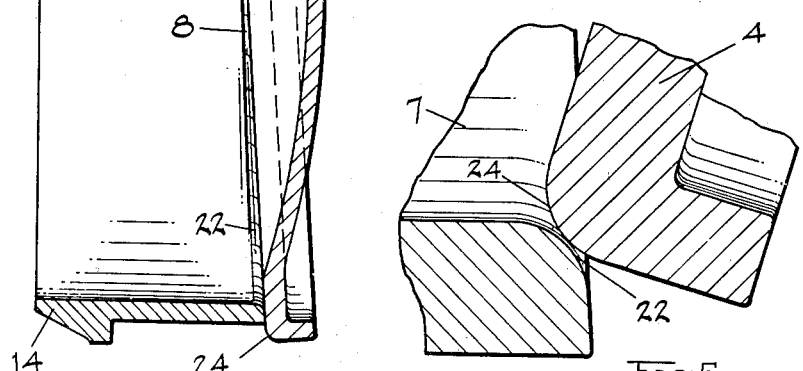
Figure 5:
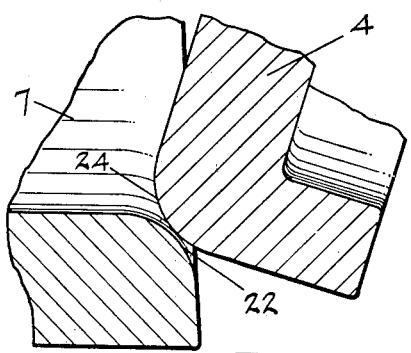

Figure 1 of the drawings illustrates a perspective of the flap-gate. Figure 2 is a view of a section of a clamp for securing the gate to a corrugated sheet metal pipe. Figure 3 is a view of a section of the gate. Figure 4 illustrates a tide gate, somewhat open or partially closed, where the sand is not all removed by the outward current of the liquid from the pipe. Figure 5 illustrates a section of coacting edges of the seat and movable valve member of the gate.

The discharge pipe 1 conveys the liquid to be discharged to a point that may be in the region of the tide water 2 that is constantly changing in its level. The gate has a flap valve member 4 that is hingedly and swingedly supported by means of the links 5 that are connected to the frame 7. The valve member 4 is preferably circular and is connected to the links at points below the uppermost part of the edge of the gate and to the edge of the gate, and the links are connected to the frame 7 at points well above the valve seat 8 of the frame to produce a free movement, within a limited range, of the flap valve relative to the links, such as is shown in Figure 4. The outward movement of the valve relative to the links may be adjustably limited by the screws 10.

The frame 7 may be connected to the end of the pipe 1 by means of the radially extending lugs 11 and the clamps 12. The rear edge of the frame 7 is formed frustumal as at 14 to substantially correspond with the end flare of the corrugated pipe formed by cutting the pipe along the ridge of one of its corrugations. The lugs 11 have ridges 15 that have semi-circular surfaces and the clamps 12 have recesses 17 also having circular surfaces that fit the ridges 15, and, therefore, the clamps pivot on the ridges when the other end 18 is in engaging relation with the flared edge 19 of the pipe 1. Preferably, the end 18 of the clamp is provided with a lead strip 20 having edge parts turned up and about the corners of the end 18 of each clamp 12 to form a yielding cushion for engaging the surface of the end of the thin sheet metal wall of the pipe 1 and clamp it to the surface 14 of the frame 7 by the bolt 21.

The centers of the links 5 are substantially in the vertical plane of the center of gravity of the movable part of the gate, and thus the tide gate operates by the differential head of the liquids within the pipe and exterior to the gate, and, by reason of the support of the valve member 4 by the links 5, it operates quite in accordance with the relative height of the centers of pressure of the liquid within and without the gate. Thus, on the drop of the level of the liquid outside of the gate, there is a tendency of the gate to open at the top of the pipe. When this occurs, it allows the liquid to move between the lower edge portions of the valve and its seat. This is particularly the case where sand is deposited exterior to the gate during the high tide and after the closure of the gate. The sand engages the lower edge of the gate and the center of pressure of the liquid within the gate causes the upward edge of the gate 4 to tilt outward by the free swing of the lower ends of the links 5. The downward wash of the water from the pipe 1 from between the edges of the gate and the frame, and particularly the bottom edge portions thereof, will, as indicated in Figure 4, wash a large part of the deposited sand away from the lower edge of the gate and free the gate for opening at the bottom of the pipe as well as at the top, or, if a large amount of sand is deposited, it may hold the gate in its tilted position until the gate is closed by the change from outward flow to inward flow.

In the outward flow during the engagement of the gate by the sand, the head of the water within the pipe is higher than that of the water outside of the gate, and also, the tilt of the gate by engagement of the sand and the pressure in the pipe causes the link to swing upward and outward and the lower edge of the gate to rise and swing inward as limited by the edges of the flap and its seat and open the end of the pipe. To aid in such movement, the lower semi-circular edge portions 22 and 24 of the flap and the seat are rounded as indicated in Figure 5. This movement also opens the gate at the lower side of the frame and causes discharge of water below the lower edge part of the gate and at a point below the deposited sand which aids in washing the sand from in front of the gate.

I claim:

1. In a flap-gate for a discharge pipe; a movable circular gate member having a valve face; a circular gate supporting frame for connection to the end of the discharge pipe and having a valve seat coacting with the valve face for closing the said valve seat; a pair of links having one pair of ends connected to the frame at a point well above the top of the gate member and the other pair of ends pivotally connected to the edge of the gate member well below the top of the gate member for pivotally and swingingly supporting the gate member to permit free inward and outward movement of the lower edge of the gate member with respect to the valve seat; the lower semi-circular inner edge of the valve seat and the lower semi-circular outer edge of the valve face formed convexedly curved to produce relatively free sliding movement of one edge on the other upon raising of the movable gate member by outward swinging of the links caused by the location of the center of pressure of the liquid of the interior surface of the gate member above that of the center of pressure of the liquid on the exterior surface of the gate member.

2. In a flap-gate for controlling the flow of liquid through a discharge pipe into tide water having depositable sand, a movable circular gate member having a valve face; a circular gate supporting frame for connection to the end of the discharge pipe and having a valve seat coacting with the valve face for closing the said valve seat; a pair of links having one pair of ends pivotally connected to the frame at a point well above the top of the gate member and the other pair of ends pivotally connected to the gate for pivotally and swingingly supporting the gate member; and the lower semi-circular inner edge of the valve seat and the lower semi-circular outer edge of the valve face formed convexedly curved to produce relatively free sliding movement of one rounded edge on the other upon raising of the movable gate member by outward swinging of the links and opening of the valve seat at the lower part of the frame caused by the location of the center of pressure of the liquid on the interior surface of the gate member above that of the center of pressure of the liquid and sand on the exterior surface of the gate member to remove the sand which may lodge on the valve face or the valve seat.

3. In a flap-gate for controlling the flow of liquid through a sheet metal discharge pipe into tide water having depositable sand, a movable circular gate member having a valve face; a circular gate seat frame pivotally supporting said gate member and having a frustumal surface fitting an end part of the pipe; and a plurality of radial lugs, the lugs having semi-cylindrical ridges; clamps having recesses curvedly fitting the ridges for pivotal supported thereon; lead strips located on the ends of the clamps remote from the recesses; and bolts for forcing the lead strips against the pipe and the pipe against the frustumal surface of the seat frame as the clamps are pivotally moved about the semi-cylindrical surfaces of the ridges of the lugs upon tightening the bolts for securing the seat frame to the pipe.

CHALMERS S. BROWN.